March 27, 1951 C. E. LOMAX 2,546,644

COMBINED LINE AND METERING RELAY AND ASSOCIATED CIRCUITS

Filed Dec. 12, 1946

INVENTOR.
CLARENCE E. LOMAX

BY *Chas. W. Candy*

ATTORNEY

Patented Mar. 27, 1951

2,546,644

UNITED STATES PATENT OFFICE 2,546,644

COMBINED LINE AND METERING RELAY AND ASSOCIATED CIRCUITS

Clarence E. Lomax, Chicago, Ill., assignor to Automatic Electric Laboratories, Inc., Chicago, Ill., a corporation of Delaware Application December 12, 1946, Serial No. 715,820

5 Claims. (Cl. 179—7)

The present invention relates in general to telephone systems and in particular to measured service telephone systems.

The principal object of the invention is to provide an improved circuit arrangement for controlling the operation of a subscriber's meter in a telephone system.

A further object of the invention is the provision of a combination line relay and service meter in a subscriber's line circuit.

A feature of the invention is the joint control of a finder start circuit by a line relay and a cut-off relay in a subscriber's line circuit.

Another feature is the joint control of a finder start circuit by a combined line relay and meter and a cut-off relay.

A further feature is the provision of a combined control relay and meter which is disconnected on incoming calls.

A still further feature is the provision of a relay for a subscriber's line which operates on outgoing calls to busy the line against incoming calls and also to assess a charge against the subscriber for the outgoing call.

Another feature of the invention is the provision of a two step combined line relay and meter which may be operated to both steps by the same potential.

Figure 1:
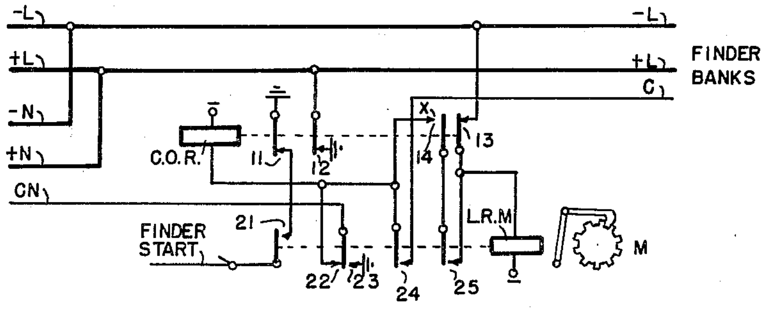

Other objects and features of the invention will become apparent upon a further perusal of the specification taken in conjunction with the accompanying drawing in which:

Fig. 1 is a circuit diagram illustrating the invention as used in conjunction with a three wiper line finder.

Fg. 2 is a circuit diagram illustrating a modified form of the invention as used in conjunction with a four wiper line finder.

Referring now to Fig. 1, a subscriber's line circuit is shown. Relay LRM is a two step relay arranged to operate its spring contacts when connected to a certain potential and to operate the counting device M when connected to another potential. When the line circuit is taken into use by a calling subscriber, relay LRM will be energized over the following circuit; from battery, winding of LRM, contact 13, subscriber's loop circuit, and contact 12 to ground. Relay LRM thus energized operates its spring contacts 21, 22, 23, 24, and 25 but not the counting device M. LRM prepares a holding circuit for itself at contact 25, closes a point in the energizing circuit of cut-off relay COR at contact 24, connects ground over conductor CN to the associated connector terminal at contact 23, and completes the start circuit to a line finder at contact 21. The line finder (not shown) operates in a well-known manner to find the calling line and upon finding the line connects ground to the associated conductor C. The cut-off relay COR now operates over an obvious circuit and at preliminary make contact 14 completes the holding circuit for LRM which now holds over the circuit from grounded conductor C, contacts 24, 14, and 25, and winding of LRM to battery, opens the original energizing circuit of LRM at contacts 12 and 13, and opens the line finder start circuit at contact 11.

LRM will operate to a second step over its present hold circuit when booster battery is returned over conductor C by any suitable means such as, for instance, is shown in my copending application Serial No. 728,185, filed February 12, 1947. LRM thus energized will operate the counting device M. Booster battery will ordinarily be applied only momentarily and relay LRM may be arranged to restore to its half-way or first step position or to hold at its second step position when booster battery is removed from the C conductor. If LRM is arranged to restore to its first step position when booster battery is removed from the C conductor, the circuit may be used in conjunction with a repeated metering system. If LRM is arranged to hold on its second step it will prevent the counting device from being falsely operated subsequent to its initial second step operation.

When the subscriber's line is opened, ground is removed from conductor C; hence both COR and LRM will restore, the latter being arranged to open the finder start circuit at contact 21.

If an incoming call is received, conductor CN will be grounded and relay COR will operate over an obvious circuit through contact 22. COR thus energized opens a point in the finder start circuit at contact 11, opens an energizing circuit for relay LRM at contacts 12 and 13, and at preliminary make contact 14, closes a point in another energizing circuit for LRM which is ineffective due to the open position of contact 25. LRM is thus prevented from operating on an incoming call by the operation of contacts 12 and 13, and the position of contact 25.

Figure 2:
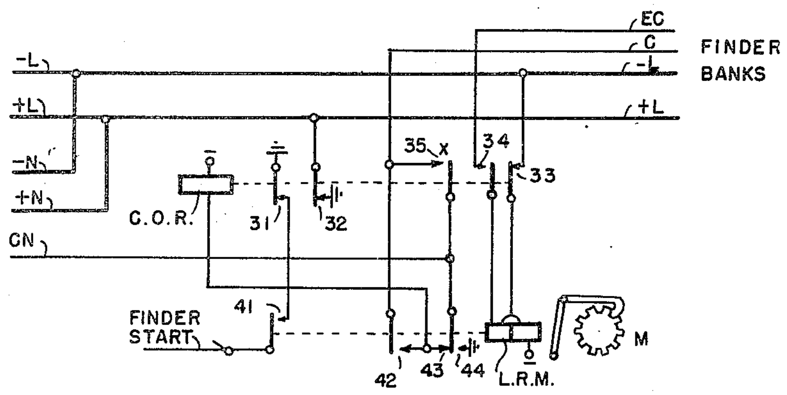

Referring now to Fig. 2, a subscriber's line circuit is shown substantially the same as Fig. 1 but with certain modifications to enable its use in conjunction with a four wiper line finder. Relay LRM is again a two step relay but in this case it has a tapped winding. When the line circuit is taken into use, relay LRM will operate over the following circuit; from battery, right hand portion of the winding of LRM, contact 33, subscriber's loop circuit, and contact 32 to ground. Relay LRM thus energized will operate its spring contacts but not the counting device M. LRM thus connects ground to the associated connector terminal at contact 44, prepares a circuit for cut-off relay COR at contact 42, and completes the starting circuit to a line finder at contact 41. The line finder now hunts for the calling line in a well-known manner and connects ground to conductor C when the line is found. Cut-off relay COR now operates over an obvious circuit through contact 42 and at preliminary make contact 35 completes an auxiliary grounding circuit for the associated connector terminal, completes an obvious circuit to the full winding of LRM at contact 34, opens the line finder start circuit at contact 31 and at contacts 32 and 33 opens the original energizing circuit for relay LRM which de-energizes. Upon de-energization of LRM contact 43 is arranged to make before contact 42 breaks; hence upon restoring, LRM substitutes ground through contact 35 from conductor C for ground through contact 42 thus maintaining COR operated, opens the original energizing circuit of relay COR at contact 42 and at contact 41 opens a further point in the line finder start circuit. Relay LRM may now operate to a second step over its full winding to operate the counting device M when ground is returned over conductor EC by any suitable means in the subsequent switching equipment. This arrangement permits the use of rapid repeated metering.

When the subscriber's line is opened, ground is removed from conductor C and relay COR will restore.

When an incoming call is received, conductor CN will be grounded and COR will operate over an obvious circuit through contact 43. Relay COR thus energized opens a point in finder start circuit at contact 31, opens an energizing circuit for LRM at contacts 32 and 33, closes an energizing circuit for LRM at contact 34, and at preliminary make contact 35 connects ground from conductor CN to conductor C, thus busying the associated finder terminals. LRM will not operate under this condition because of the operation of contacts 32 and 33 and the fact that conductor EC will not return ground.

While particular embodiments of the invention have been disclosed, it will be understood that various modifications may be made therein which are within the true spirit and scope of the invention.

What is claimed is:

1. In a telephone system, a line circuit, a cut-off relay individual thereto, a two winding combined meter and line relay also individual thereto, circuit means including contacts controlled by said cut-off relay normally connecting said line relay to said line circuit over one of said windings for operating said line relay in a first step operation responsive to the initiation of a call over said line circuit, other circuit means including contacts controlled by said line relay in its first step operation for operating said cut-off relay when said call is further extended, a metering device individual to said line relay for assessing charges on completed calls, a mechanical linkage connecting said line relay with said metering device, and further circuit means controlled by said cut-off relay for connecting said line relay to said line circuit over both said windings and completed responsive to the completion of said call for operating said line relay in a second step operation for operating said linkage to operate said metering device.

2. In a telephone system, a subscriber's line, a combined meter and line relay normally connected to said line and operated in a first step operation responsive to the initiation of a call over said line, means controlled by said first step operation of said line relay for initiating the further extension of said call, a cut-off relay individual to said line, circuit means including contacts controlled by said first step operation of said line relay and completed responsive to said call being further extended for operating said cut-off relay, contacts controlled by said operated cut-off relay for disconnecting said line relay from said subscriber's line, other circuit means including contacts controlled by said cut-off relay and completed responsive to the completion of said call for operating said line relay in a second step operation, a metering device associated with said line relay for assessing charges on completed calls, and an armature and pawl arrangement on said line relay operated responsive to said second step operation for operating said metering device.

3. In a telephone system, a subscriber's line, a cut-off relay individual thereto, a combined meter and line relay also individual to said line, a first circuit including contacts controlled by said cut-off relay normally connecting said line relay to said line for energizing said line relay in a first step operation responsive to the initiation of a call over said line, a second circuit including contacts controlled responsive to said first step operation of said line relay for initiating the further extension of said calling line, a third circuit including other contacts controlled by said first step operation of said line relay and completed responsive to said further extension for operating said cut-off relay, a fourth circuit including contacts controlled by said cut-off relay and completed responsive to the completion of said call for operating said line relay in a second step operation, a metering device associated with said line relay for assessing charges on completed calls, and an armature and pawl arrangement on said line relay controlled responsive to said second step operation for operating said metering device.

4. In a telephone system, a subscriber's line, a combined meter and line relay normally connected to said line and operated in a partial operation responsive to the initiation of a call over said line, means controlled by said partial operation of said line relay for further extending said call, a cut-off relay individual to said line, a control conductor individual to said line for transmission of received control signals, circuit means including said control conductor and contacts controlled by said partially operated line relay for operating said cut-off relay responsive to said call being further extended, first contacts controlled by said operated cut-off relay for connecting said partially operated line relay to said control conductor, other contacts controlled by said operated cut-off relay for disconnecting said line relay from said subscriber's line while said line relay is maintained in said partially operated condition over said control conductor, a metering device individual to said line relay for assessing charges on completed calls, a mechanical linkage connecting said line relay with said metering device, and a metering circuit including said control conductor and said first contacts controlled by said cut-off and other contacts controlled by said line relay for operating said line relay in a complete operation responsive to said call being completed for controlling said linkage to operate said metering device.

5. In a telephone system, a subscriber's line, a combined meter and line relay having two windings and normally connected to said line over one of said windings and operated in a partial operation responsive to the initiation of a call over said line, a cut-off relay individual to said line, a control conductor individual to said line for transmission of received control signals, circuit means including said control conductor and contacts controlled by said partially operated line relay for operating said cut-off relay when said call is further extended, contacts controlled by said operated cut-off relay for disconnecting said one winding of said line relay from said line to thereby deenergize said one winding and restore said line relay; a holding circuit including said control conductor, contacts of said operated cut-off relay and contacts of said restored line relay for maintaining said cut-off relay operated; an extra control conductor individual to said line for transmission of received control signals, other circuit means including said extra control conductor and contacts controlled by said operated cut-off relay for reenergizing said line relay over said two windings in a full operation responsive to the completion of said call, a metering device individual to said line relay for assessing charges on completed calls, and a mechanical linkage connecting said line relay with said metering device and operated responsive to said full operation of said line relay for operating said meter.

CLARENCE E. LOMAX.

REFERENCES CITED

The following references are of record in the file of this patent:

UNITED STATES PATENTS

| Number | Name | Date |
|---|---|---|
| 1,527,434 | Lenagham | Feb. 24, 1925 |
| 2,096,436 | Massonneau | Oct. 19, 1937 |
| 2,346,910 | Deakin | Apr. 18, 1944 |
| 2,383,826 | Spencer | Aug. 28, 1945 |